April 12, 1927.

M. OLSON 1,624,063

CHAIN MAKING MACHINE

Filed July 11, 1925      5 Sheets-Sheet 4

INVENTOR
Mauritz Olson
BY
Chamberlain & Newman
ATTORNEYS

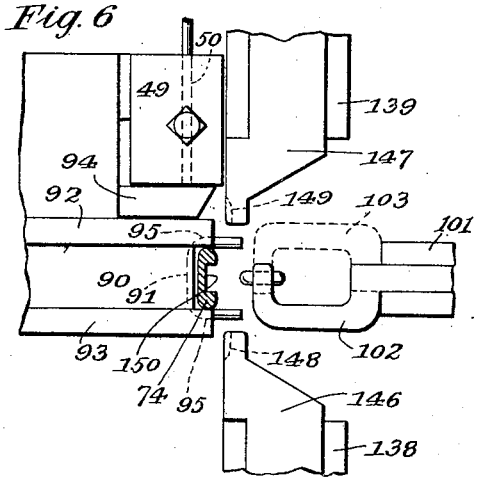
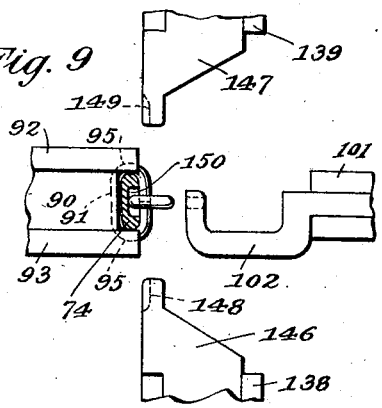
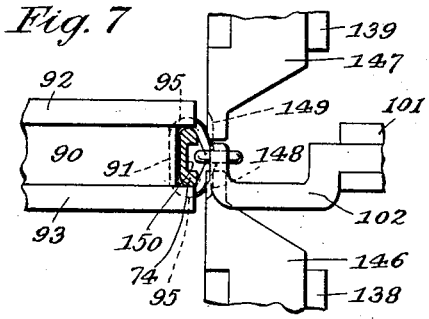
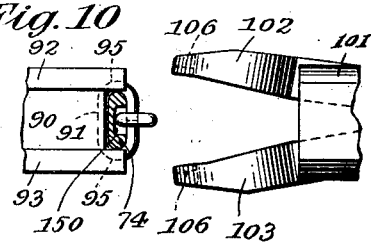
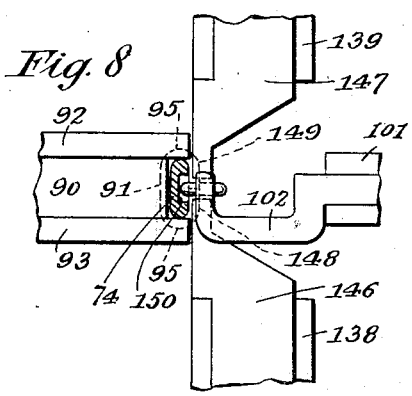
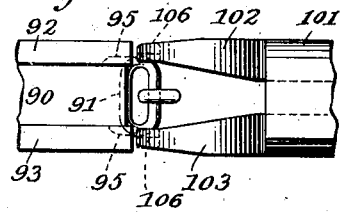
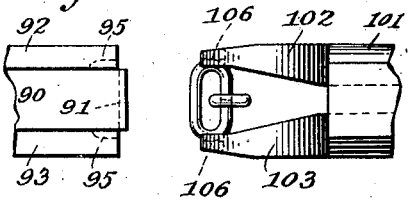

Patented Apr. 12, 1927.

1,624,063

UNITED STATES PATENT OFFICE.

MAURITZ OLSON, OF BRIDGEPORT, CONNECTICUT, ASSIGNOR TO THE A. H. NILSON MACHINE CO., OF BRIDGEPORT, CONNECTICUT, A CORPORATION OF CONNECTICUT.

CHAIN-MAKING MACHINE.

Application filed July 11, 1925. Serial No. 42,875.

This invention relates to a chain making machine and more particularly to improved tools and mechanism, adapted to a four slide machine, for forming straight link chains from cut lengths of wire, and which links are preferably adapted after being completed in the present machine to be welded in another machine, and for certain uses also twisted in a third machine, not shown. This latter type of twisted chain is commonly used for automobile tire cross chains.

An object of the invention is to provide a machine of this character in which the formation of the chain may be carried on continuously at a high rate of production, and without necessitating the use of a skilled operator, it being possible for one man to operate a number of machines by keeping them supplied with wire. A further object is to provide a machine in which the several forming and holding tools are mounted at the upper side, and particularly in which the forming mandrel is at the upper side and moves downwardly into relation with the horizontally movable bending tools, so that the chain being formed may move downwardly by gravity into a suitable receptacle.

A still further object is to provide a machine in which the links are formed in a horizontal position, the previously formed link being supported vertically while the link being formed is interlocked therewith.

With the above and other objects in view, an embodiment of the invention is shown in the accompanying drawings, and this embodiment will be hereinafter more fully described with reference thereto, and the invention will be finally pointed out in the claims.

In the drawings:—

Figs. 6 to 12 are detail plan views showing the several steps in the formation and assembling of the chain links.

Similar reference characters indicate corresponding parts throughout the several figures of the drawings.

Figure 1:
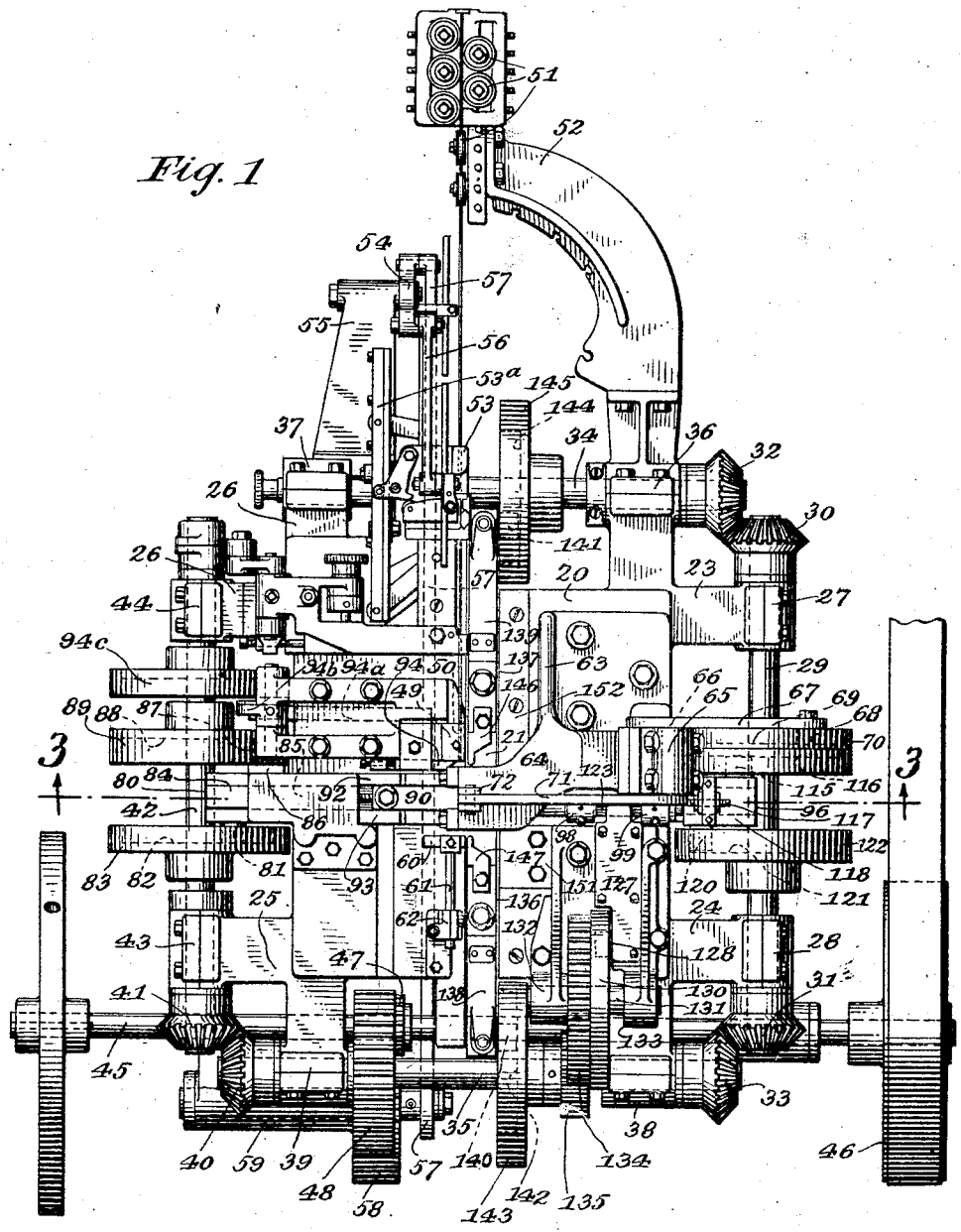
Fig. 1 is a plan view of a chain making machine according to the present embodiment of the invention.
Figure 2:
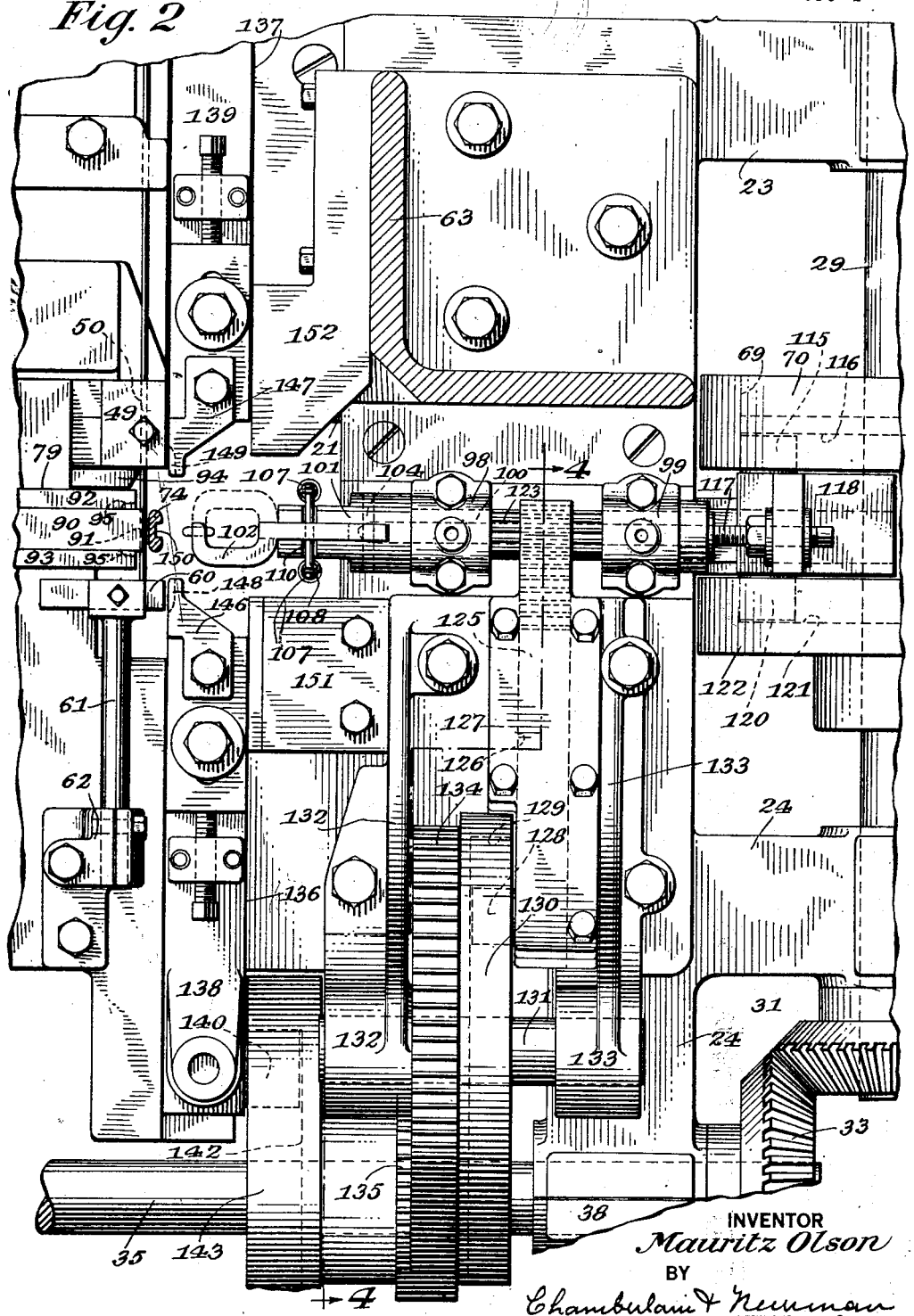
Fig. 2 is an enlarged detailed plan view partly in section of the central part of the machine as shown in Fig. 1, and showing more particularly the point at which the chain links are formed and assembled.
Figure 3:
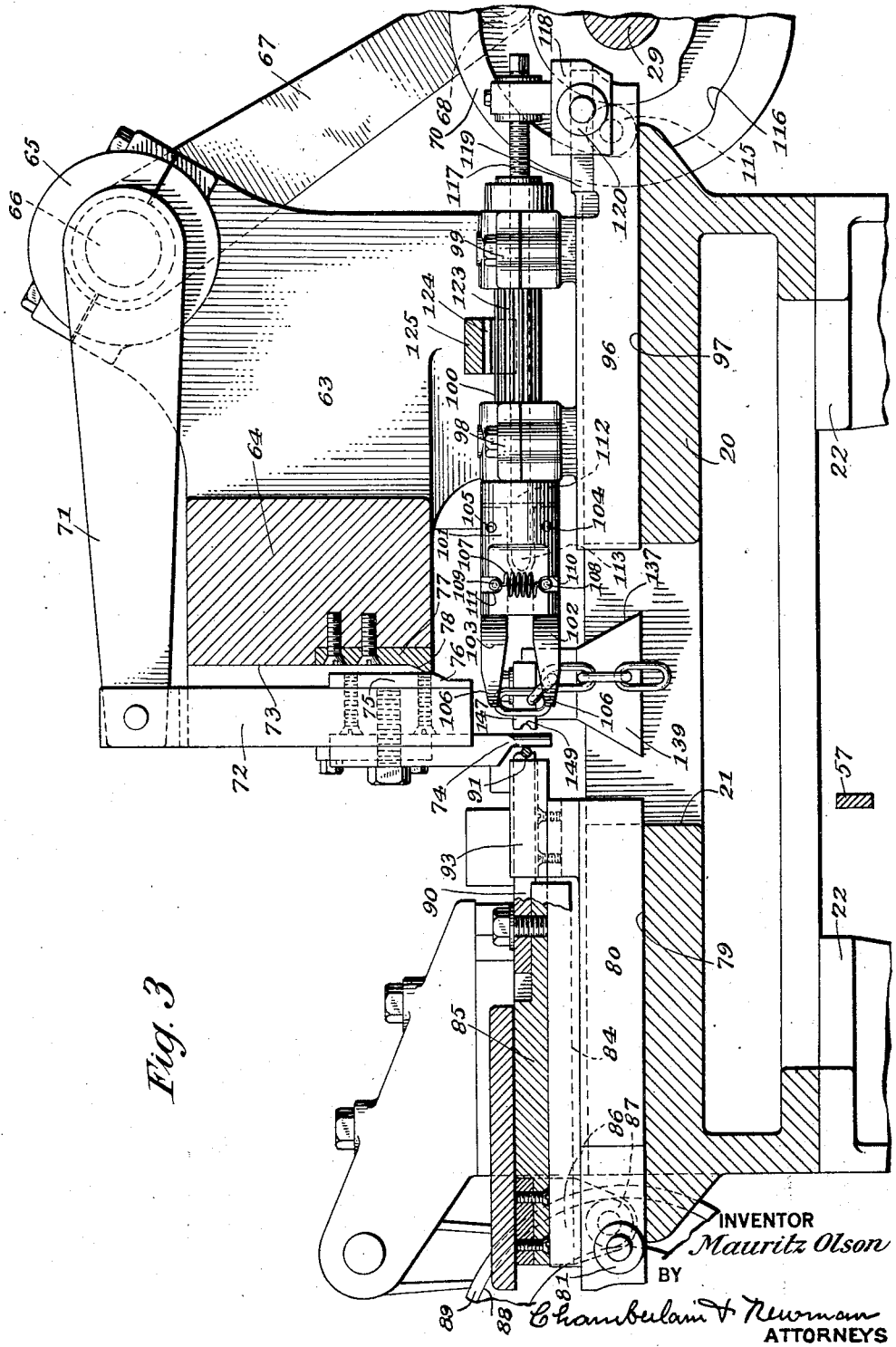
Fig. 3 is an enlarged vertical sectional view taken along the line 3—3 of Fig. 1.
Figure 4:
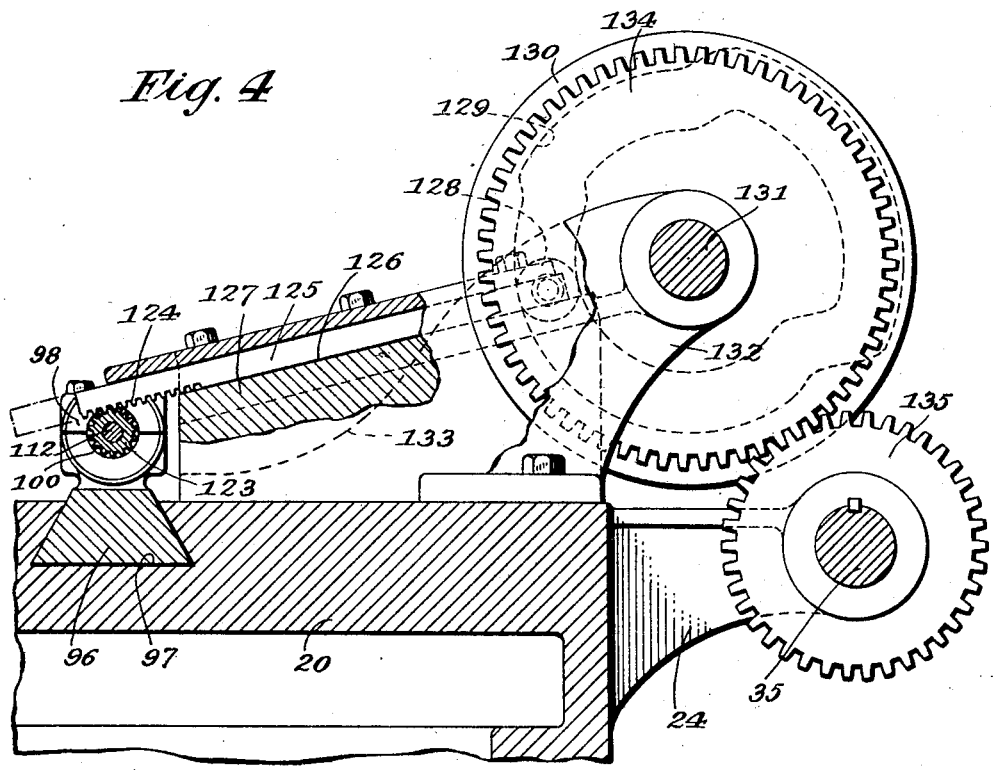
Fig. 4 is a vertical sectional view taken along the line 4—4 of Fig. 2, and showing the means for rotating the slidable chain support for supporting a previously formed link as the next link is formed and interlocked therewith.
Figure 5:
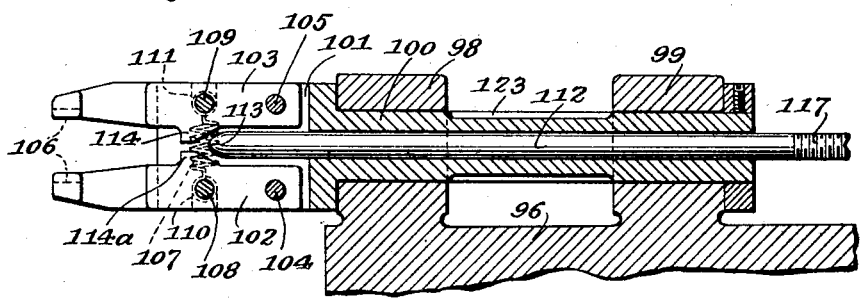
Fig. 5 is a longitudinal sectional view of the slidable chain support.

Referring to the drawings, and more particularly to Fig. 1 thereof, the machine according to the present embodiment of the invention comprises a substantially rectangular bed plate 20, provided centrally with an opening 21 above which the chain is adapted to be formed and through which the finished chain is adapted to pass to a suitable receptacle, said plate being supported at its four corners on legs 22, and being further provided at its four corners with right angle bearing supports 23, 24, 25 and 26 and in which the shafting carrying the cams and gears for operating the machine is supported in surrounding relation to the bed plate. Within bearings 27 and 28 of the respective supports 23 and 24 there is journaled a shaft 29 provided at its ends with miter gears 30 and 31 which mesh with miter gears 32 and 33 upon the rearward ends of shafts 34 and 35 journaled in bearings 36 and 37 of the bearing supports 23 and 26 and bearings 38 and 39 of the bearing supports 24 and 25, and upon the forward end of the shaft 35 there is provided a miter gear 40 which meshes with a miter gear 41 mounted upon one end of a shaft 42 journaled in bearings 43 and 44 of the bearing fixtures 25 and 26. The geared train of shafting is driven by a main drive shaft 45 driven from any suitable source, as for instance by a belt carried over the pulley 46, and provided with a pinion 47 meshing with a gear 48 secured upon the shaft 35.

The opening 21 is rectangular in form and the wire for forming the chain links is adapted to be fed above and contiguous to the forward side thereof, and to this end a wire guiding support 49 is mounted upon the bed plate at one corner of the opening 21 and is provided with a passage 50 through which the wire is guided and to which it is fed from the straightening rollers 51 mounted upon a support 52.

The feeding mechanism for the wire is adapted to feed it intermittently in lengths corresponding to the length of wire required for forming one link. This mechanism as illustrated in Fig. 1 consists of a gripping slide 53 adapted to grip during movement in feeding direction and release during return movement, and mounted for reciprocation in a slideway 53ª. Movement is imparted to the gripping slide by means of a lever 54, mounted in a bearing support 55, connected at its upper end by a link 56 to the slide, and connected at its lower end to a rod 57 eccentrically connected to a gear 58 journaled in a bracket bearing 59 and meshing with the pinion 47 of the main drive shaft. This type of gripping slide is well known, and no further description of the same is deemed necessary.

As the length of wire is fed forwardly and projected from the support 49 its end abuts a stop plate 60 mounted upon the end of a rod 61 adjustably supported in a bracket 62 mounted upon the bed plate, and said lengths of wire are adapted to be cut off by mechanism, presently to be described, and thereupon bent into link form.

Upon the corner of the bed plate adjacent the bearing support 23 there is secured a standard 63 provided with an overhanging projecting portion 64 disposed above the opening 21, and in a bearing 65 there is journaled a crank shaft 66, provided upon one end with a lever 67 upon the end of which there is provided a roller 68 engaging the cam groove 69 of a cam 70 mounted upon the shaft 29, and upon the other end of said shaft 66 there is provided a lever 71 projecting above the portion 64 and pivotally connected at its forward end to a vertical mandrel carrying slide 72 mounted for reciprocatory and slight pivotal movement in a slideway 73 provided in the front wall of said portion 64. Upon the lower end of this slide there is secured a mandrel 74, adapted as the slide is reciprocated to be moved into and out of relation with the wire bending slides, hereinafter more fully described, and adapted in its lowered position to constitute a forming mandrel about which the cut length of wire is bent into link form. Upon the inner side of the slide 72 there is provided a camming block 75 provided with a beveled surface 76 adapted during the reciprocation of the slide to cooperate with a camming block 77 secured in the portion 64 and also provided with a beveled surface 78 adapted to cooperate with the beveled surface 76 so that as the slide moves downwardly and the beveled surface 76 passes over the beveled surface 78 the mandrel is swung forwardly, this being the operative position for forming the wire about the same, and as the slide is reciprocated upwardly and the beveled surface 76 passes the beveled surface 78, the slide is swung rearwardly to a slight extent, this action occurring, as will hereinafter more fully appear, before the mandrel entirely leaves the partially formed link, for cooperating with the final link forming movement of the slides.

At the forward portion of the bed plate and at right angles to the line of movement of the wire there is provided a slideway 79 in which a slide 80 is mounted for horizontal reciprocation, being provided at its rearward end with a roller 81 engaged in a cam groove 82 of a cam 83 mounted upon the shaft 42, and in the upper side of said slide 80 there is provided a slideway 84 in which a slide 85 is mounted for horizontal reciprocation relatively to the slide 80, said slide 85 being provided at its rearward end with a bracket 86 carrying a roller 87 which engages a cam groove 88 in a cam 89 also mounted upon the shaft 42. Upon the forward end of the slide 85 there is secured a wire holder 90 having a groove 91 in its forward end adapted to engage the wire, and at each side of said holder 90 there are mounted upon the slide 84 wire bending tools 92 and 93. I also provide adjacent to the slide 80 a wire shearing blade 94 that is carried by a slide 94ª that is reciprocated through a vertical lever 94ᵇ by a cam 94ᶜ mounted upon the shaft 42. This cutter is adapted as the slide 94ª moves forwardly to move across the end of the opening 50 of the block 49 to cut off the length of wire, the severed length of wire being pressed forwardly by the holding tool 90 against the mandrel 74. At this point the wire is adapted to be bent into U-shape about the mandrel 74 and for this purpose the slide 85 is reciprocated forwardly causing the tools 92 and 93 to bend the wire into U-shape about the mandrel where it is held. The tools 92 and 93 are grooved upon their inner sides, as at 95, so that the bent wire is engaged and supported within said grooves against turning, as clearly indicated in Fig. 6, the ends of the wire projecting forwardly with respect to the mandrel and the ends of the tools 92 and 93 which tools remain in the forwardly projected position during further bending operations upon the end of the wire.

The bending of the ends of the wire takes place with relation to the previously formed link, that is the ends are bent into the opening of such link, the formed link being supported in vertical position with respect to the horizontally disposed link being formed by supporting means, presently to be described, and to which vertical position said formed link has been moved by such supporting means from the horizontal forming position. The supporting means for the formed link is provided upon the bed plate rearwardly of the opening 21 and consists of a horizontal reciprocatory slide 96 movable in a slideway 97 of the bed plate and provided at its upper side with spaced bearing supports 98 and 99 in which is journaled a tubular shaft 100 having a jaw supporting head 101 at its forward end.

A pair of jaws 102 and 103 are pivotally mounted at 104 and 105 in said head, and are normally drawn inwardly at their projecting and grooved gripping ends 106 by means of springs 107 tied between studs 108 and 109 intermediate the ends of the jaws, and which move in slots 110 and 111 in the head 101.

The jaws are adapted to be opened, in properly timed relation, by means of a rod 112 slidably engaged in the bore of the shaft 100, and provided at its forward end with a point 113 adapted upon relative forward reciprocation of the rod to engage between the beveled camming portions 114 and 114$^a$ of the jaws to open them, the jaws closing under the action of the spring as the rod is withdrawn.

The slide 96 and the rod 112 are adapted to have relative independent reciprocatory movement, and for this purpose a roller 115 is provided at the rearward end of said slide 96 and engages the cam groove 116 of the cam 70 mounted on the shaft 29, while there is adjustably engaged upon the threaded end 117 of the rod 112 a supporting slide block 118. slidably engaging a slide surface 119 of the slide 96, and provided at one side with a roller 120 engaging the cam groove 121 of a cam 122 mounted on the shaft 29.

In addition to the reciprocatory movement, the jaws are adapted to be rotated to move the link from horizontal to vertical positions, and for this purpose the shaft 100 is provided between the supports 98 and 99 with longitudinal gear teeth 123 which are engaged by the rack teeth 124 at one end of a slide 125 mounted for reciprocation in the inclined slideway 126 of a slide support 127 secured to the bed plate. At its other end the slide is provided with a roller 128 engaged in the cam groove 129 of a cam 130 mounted on a shaft 131 journaled in bearing supports 132 and 133 secured to the bed plate, said cam having a gear 134 secured thereto which meshes with a gear 135 mounted on the shaft 35. The gears 135 and 134 have a ratio of two to one, so that as the shaft 35 is rotated through two revolutions, representing two link forming cycles of the machine, the cam 130 is rotated through a single revolution, its design being such that the jaws 102 and 103, after moving a completed link rearwardly in horizontal position, as shown in Fig. 12, move forwardly into relation with the next link being formed, at the same time being turned a quarter turn in one direction to position the link in vertical position, as shown in dotted lines in Fig. 6, while the corresponding movement during the next cycle is a rotation of the jaws a quarter turn in the opposite direction, as shown in full lines in Fig. 6, these opposed movements being brought about by the downward reciprocation of the slide 125 during a half revolution of the cam 130 and the upward reciprocation during the other half revolution.

At each side of the opening 21 and at right angles to the slideways 79 and 97 there are provided slideways 136 and 137, in which slides 138 and 139 are slidably engaged and are adapted to be correspondingly moved inwardly and outwardly in opposed relation to each other to complete the links. For this purpose they are provided at their outer ends with rollers 140 and 141 respectively engaging the cam groove 142 of a cam 143 mounted on the shaft 35 and the cam groove 144 of a cam 145 mounted on the shaft 34, while at their inner ends there are adjustably secured wire bending tools 146 and 147, grooved as at 148 and 149 for engagement with the wire.

The operation of these tools is clearly shown in Figs. 6 to 8. As the U-ing of the wire is completed, as shown in Fig. 6, the previously formed link, held in vertical position, is moved forwardly, a recess 150 being provided in the rearward side of the mandrel 74 for receiving one side of it, and thereupon the slides 138 and 139 move inwardly bending the ends of the wire about the mandrel and into the opening of the previously formed link, as shown in Fig. 7. As the slides continue their inward movement the slides 80 and 84 are moved inwardly to press the link into closed form, the bending tools 146 and 147 constituting fixed supports during such action, block supports 151 and 152 being secured upon the bed plate at the rearward slides of said tools to firmly support them against the pressure of the slides 80 and 84. Simultaneously with this final forming operation the mandrel 74 moves upwardly to a point where the beveled cam surfaces 76 and 78 permit it to swing rearwardly from the position shown in Fig. 7 to that shown in Fig. 8, the mandrel remaining within the link, however, until it is completely formed, and cooperating with the tools 146 and 147 to shape it. The slides 138 and 139 are now withdrawn, as shown in Fig. 9, and at the same time the jaws 102 and 103 open to release the vertically supported link, which drops down upon the horizontal formed link, and at the same time these jaws move rearwardly and are rotated to horizontal position, as shown in Fig. 10, the formed link being supported by the wire holder 90, the bending tools 92 and 93, and the mandrel 74. The jaws now move forwardly again in horizontal position and close upon the formed link, the slides 80 and 84 carrying the tools 92 and 93 and the wire holder 90 being withdrawn as the link is gripped and supported by the jaws, as shown in Fig. 11; the jaws thereupon moving rearwardly again carrying the formed link to the position shown in Fig. 12, whereupon the next cycle begins, the jaws moving forwardly and rotating the link into vertical position, as shown in Fig. 6, to have the next link formed about it. It will be understood that as the chain is formed it moves downwardly through the opening 21 into a suitable receptacle.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a chain making machine, a vertical mandrel adapted to have lateral movement, wire feeding means for feeding wire horizontally in relation thereto, horizontally movable means adapted to have an initial movement to support said wire against said mandrel, means for bending said wire into U-form about said mandrel, means for supporting the previously formed link in vertical position in relation to said mandrel, horizontally movable means movable at a right angle to said first mentioned horizontally movable means for partially bending the wire ends inwardly about said mandrel whereby they are engaged in the opening of said previously formed link in spaced relation to said mandrel, said first mentioned horizontally movable means adapted to have a further movement to compress said link against said last mentioned horizontally movable means and said mandrel whereby the link is completed, said mandrel adapted to move laterally during said final link forming operation.

2. In a chain making machine, a vertically movable mandrel, means pivotally supporting said mandrel whereby it is adapted to have lateral movement, wire feeding means for feeding wire horizontally in relation thereto, horizontally movable means adapted to have an initial movement to support said wire against said mandrel, means for bending said wire into U-form about said mandrel, means for supporting the previously formed link in vertical position in relation to said mandrel, horizontally movable means movable at a right angle to said first mentioned horizontally movable means for partially bending the wire ends inwardly about said mandrel whereby they are engaged in the opening of said previously formed link in spaced relation to said mandrel, said first mentioned horizontally movable means adapted to have a further movement to compress said link against said last mentioned horizontally movable means and said mandrel, whereby the link is completed, said mandrel adapted to move laterally during said final link forming operation.

3. In a chain making machine, a vertically reciprocating movable mandrel, cam means adapted during the downward vertical movement of said mandrel to impart lateral movement thereto, wire feeding means for feeding wire horizontally in relation thereto, horizontally movable means adapted to have an initial movement to support said wire against said mandrel, means for bending said wire into U-form about said mandrel, means for supporting the previously formed link in vertical position in relation to said mandrel, horizontally movable means movable at a right angle to said first mentioned horizontally movable means for partially bending the wire ends inwardly about said mandrel whereby they are engaged in the opening of said previously formed link in spaced relation to said mandrel, said first mentioned horizontally movable means adapted to have a further movement to compress said link against said last mentioned horizontally movable means and said mandrel, whereby the link is completed, said mandrel adapted to move laterally in opposed direction to said first mentioned lateral movement during said final link forming operation.

Signed at Bridgeport, in the county of Fairfield and State of Connecticut, this 8th day of July A. D. 1925.

MAURITZ OLSON.